(12) United States Patent
    Messerly

(10) Patent No.: US 11,077,586 B2
(45) Date of Patent: Aug. 3, 2021

(54) MOLDED WIRE HARNESS TOOL ASSEMBLY

(71) Applicant: Ted Messerly, New Albany, OH (US)

(72) Inventor: Ted Messerly, New Albany, OH (US)

(73) Assignee: CVG Management Corporation, New Albany, OH (US)

( * ) Notice: Subject to any disclaimer, the term of this patent is extended or adjusted under 35 U.S.C. 154(b) by 127 days.

(21) Appl. No.: 14/190,813

(22) Filed: Feb. 26, 2014

(65) Prior Publication Data

US 2014/0239539 A1    Aug. 28, 2014

Related U.S. Application Data

(60) Provisional application No. 61/769,401, filed on Feb. 26, 2013.

(51) Int. Cl.
    *B29C 33/30*     (2006.01)
    *B29C 44/58*     (2006.01)
    *B60R 16/02*     (2006.01)
    *B29L 31/34*     (2006.01)
    *B29C 33/34*     (2006.01)

(52) U.S. Cl.
    CPC .......... *B29C 33/306* (2013.01); *B29C 33/301* (2013.01); *B29C 44/58* (2013.01); *B29C 33/34* (2013.01); *B29L 2031/3462* (2013.01); *B60R 16/0215* (2013.01)

(58) Field of Classification Search
    CPC ..... B29C 33/306; B29C 44/58; B29C 33/301; B29C 33/34; B29C 33/3462; B60R 16/0215; B29L 2031/3462
    See application file for complete search history.

(56) References Cited

U.S. PATENT DOCUMENTS

| | | | | |
|---|---|---|---|---|
| 4,307,057 A | * | 12/1981 | Hettinga | B30B 15/0023 264/328.11 |
| 5,776,401 A | * | 7/1998 | Goss | B29C 33/3857 264/225 |
| 7,376,484 B2 | * | 5/2008 | Manuel | B23P 15/007 29/238 |
| 7,908,742 B2 | * | 3/2011 | Bedoe | B60R 16/0215 29/33 M |
| 9,004,894 B2 | * | 4/2015 | Tsai | B29C 33/405 425/116 |
| 9,566,918 B2 | * | 2/2017 | Wakabayashi | B60R 16/0215 |
| 2003/0010969 A1 | * | 1/2003 | Crissey | E04C 3/34 256/19 |
| 2007/0137718 A1 | * | 6/2007 | Rushlander | F16L 11/08 138/121 |
| 2009/0106974 A1 | * | 4/2009 | Brandenburg | B29C 45/14377 29/841 |
| 2009/0220636 A1 | * | 9/2009 | Gunther | B29C 45/281 425/564 |

(Continued)

*Primary Examiner* — Kevin R Kruer
(74) *Attorney, Agent, or Firm* — Walter Haverfield LLP; James J. Pingor

(57) ABSTRACT

A system and method of manufacturing an over molded wire harness is disclosed herein. The system and method includes designing and manufacturing a positive mold made from interchangeable and reusable modular blocks. The positive mold is used to create a negative mold tool die, whereby the wire harness can be assembled in the negative mold and overmold material can be injected into the negative mold.

8 Claims, 14 Drawing Sheets

(56) References Cited

U.S. PATENT DOCUMENTS

| | | | |
|---|---|---|---|
| 2009/0241331 A1* | 10/2009 | Bedoe | B60R 16/0215 29/825 |
| 2011/0017506 A1* | 1/2011 | Kao | B29C 45/14065 174/521 |
| 2014/0144698 A1* | 5/2014 | Sato | H02G 3/0481 174/72 A |
| 2014/0175698 A1* | 6/2014 | McRoskey | B29C 41/04 264/219 |
| 2015/0170790 A1* | 6/2015 | Guthrie | B60R 16/0215 174/72 A |
| 2016/0218496 A1* | 7/2016 | Terada | B60R 16/027 |

* cited by examiner

MOLDED WIRE HARNESS TOOL ASSEMBLY

CROSS-REFERENCE TO RELATED APPLICATIONS

This application claims the benefit of U.S. Provisional Patent application Ser. No. 61/769,401 entitled "MOLDED WIRE HARNESS TOOL ASSEMBLY" filed on Feb. 26, 2013. The entirety of the above-noted application is incorporated by reference herein.

ORIGIN

The subject innovation relates generally to the field of vehicle wire harnesses and more particularly, to a system and method of manufacturing a portable negative wire harness mold tool die for vehicle wire harnesses.

BACKGROUND

The conventional process of applying a foam overmold to a wire harness for a vehicle requires several costly steps. For example, the wire harness must be assembled on a harness assembly board. The assembled wire harness is then transferred to a foam overmold station. The next step requires fitting the wire harness into a negative overmold tool die. Finally, a foam material is injected from a stationary machine to create the foam overmold on the wire harness. These steps along with redesigning and remanufacturing the negative mold tool die for each application are time consuming, inefficient, and costly.

The main conventional techniques of creating the negative overmold tool die for a wire harness foam overmold include casting and a machined tool method. Both technologies utilize a process, which creates a negative overmold tool die specific to only that design. Thus, a disadvantage to these processes is that they do not promote reusability of components to create a new negative mold tool die for different wire harnesses. Therefore, each different wire harness design requires a new negative overmold tool die, which is very expensive.

Another disadvantage to the conventional over molding tool die design is that only portions of the wire harness inside the negative overmold tool die requires over molding. The portions outside the negative overmold tool die do not require over molding. Conventionally, however, when a pressured overmold material is injected in to the negative overmold tool die, some of the material tends to overflow out of the negative overmold tool die and on to the portion of the wire harness outside the negative overmold tool die, which is undesirable.

Still another disadvantage is that currently the wire harness is assembled in two dimensions, i.e., the x- and/or y-direction. Since the wire harness cannot hold its shape, the wire harness cannot be built is the third dimension, i.e., z-direction. This limitation does not allow portions of the wire harness to be routed as needed at the final assembly on the machine. Thus, the wire harness must be reshaped and rerouted once it arrives at its final destination.

Another disadvantage is that creating an overmold harness design requires many hours to create various shapes needed for the negative mold tool die design utilizing a 3D design tool. This process is very time consuming in that many factors must be taken into account when designing an overmold harness. Some factors include tool parting line, venting, grooves, draft and radius, etc. Wire harness design engineers may not be well versed in some of these factors, which then requires time and money by the supplier to train the design engineer of overmold design requirements.

SUMMARY

The following presents a simplified summary of the specification in order to provide a basic understanding of some aspects of the innovation. This summary is not an extensive overview of the innovation. It is not intended to identify key/critical elements of the innovation or to delineate the scope of the innovation. Its sole purpose is to present some concepts of the innovation in a simplified form as a prelude to the more detailed description that is presented later.

The innovation disclosed and claimed herein, in one aspect thereof, discloses a method of manufacturing an over molded wire harness that includes forming a positive mold having a shape similar to a shape of the over molded wire harness, pouring an overmold material into a container and over the positive mold, removing the positive mold after the overmold material has cured thereby forming a negative mold, placing the negative mold onto an assembly board, assembling a wire harness in the negative mold, injecting the overmold material into the negative mold to cover the wire harness, and removing the over molded wire harness from the negative mold thereby forming the over molded wire harness.

In another aspect, the method further discloses assembling a plurality of modular blocks according to specification.

In another aspect, the innovation discloses a system of designing a positive mold that includes a customer interface component, a design component to assist in a design of the positive mold based on a specification, a database component having a library of modular blocks, and an assembly component that provides a computer generated illustration of the positive mold.

In yet another aspect, the innovation discloses a positive mold that includes a plurality of interchangeable modular blocks, a connection device having a first part inserted into an end of one modular block and a second part inserted into an end of an adjacent modular block, the connection device providing a connection between the modular blocks, an alignment pin to align adjacent modular blocks when connected, wherein the modular blocks include a connection notch to receive the first part or the second part of the connection device, and wherein the modular blocks include an alignment notch to receive the alignment pin.

To the accomplishment of the foregoing and related ends, certain illustrative aspects of the innovation are described herein in connection with the following description and the annexed drawings. These aspects are indicative, however, of but a few of the various ways in which the principles of the innovation can be employed and the subject innovation is intended to include all such aspects and their equivalents. Other advantages and novel features of the innovation will become apparent from the following detailed description of the innovation when considered in conjunction with the drawings.

DETAILED DESCRIPTION

Figure 1A:
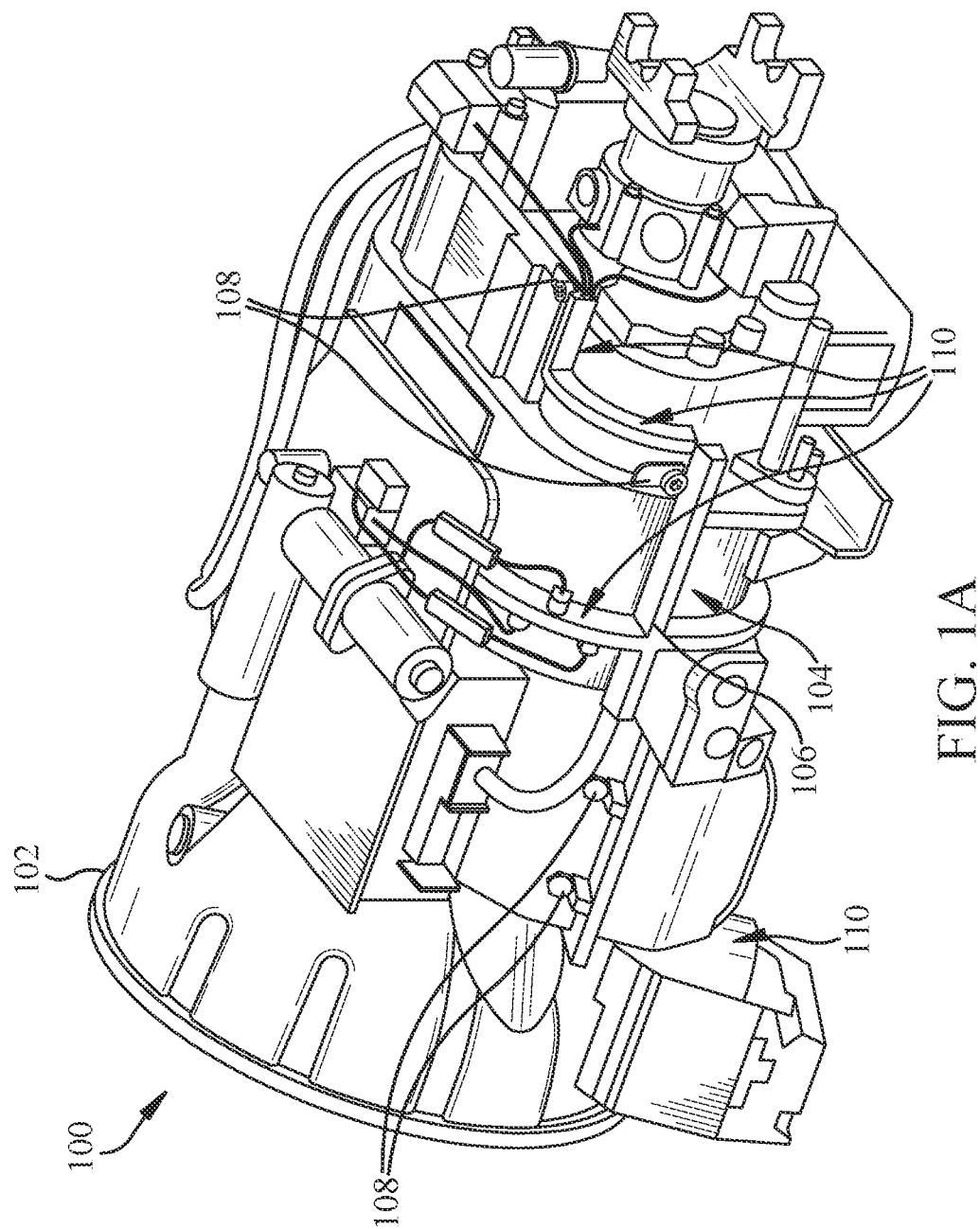
FIG. 1A illustrates a perspective view of an engine component incorporating an innovative over molded wire harness in accordance with an aspect of the innovation.

The innovation is now described with reference to the drawings, wherein like reference numerals are used to refer to like elements throughout. In the following description, for purposes of explanation, numerous specific details are set forth in order to provide a thorough understanding of the subject innovation. It may be evident, however, that the innovation can be practiced without these specific details. In other instances, well-known structures and devices are shown in block diagram form in order to facilitate describing the innovation.

While specific characteristics are described herein (e.g., thickness), it is to be understood that the features, functions and benefits of the innovation can employ characteristics that vary from those described herein. These alternatives are to be included within the scope of the innovation and claims appended hereto.

While for purposes of simplicity of explanation, the one or more methodologies shown herein, e.g., in the form of a flow chart, are shown and described as a series of acts, it is to be understood and appreciated that the subject innovation is not limited by the order of acts, as some acts may, in accordance with the innovation, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the innovation.

The innovation disclosed herein discloses an overmold system and method of producing a foamed or over molded vehicle wire harness to house a wire harness using reusable, pre-made modular positive molds (or blocks) that form a positive mold, which in turn is used to form a negative mold tool die in accordance with an aspect of the innovation. The foamed or over molded wire harness provides many benefits including ease of assembly, abrasion protection, environment protection, etc. As mentioned above, conventional systems and methods of producing over molded wire harnesses have several disadvantages.

The innovative system and method disclosed herein of producing an over molded wire harness overcomes the above mentioned disadvantages. For example, one of several advantages to the innovative overmold system disclosed herein is that inexpensive negative mold tool dies can be created using the modular positive molds to create a positive mold. The modular positive molds can be standardized and interchanged to create different shaped positive molds specific to the application. In other words, the modular positive molds can be reused and reconnected to create different shaped positive molds based on a design of the wire harness. Thus, any shaped negative mold tool die can be made quickly and inexpensively.

Referring now to the drawings, FIG. 1A is a perspective illustration of a vehicle component assembly 100 that includes a vehicle component (e.g., transmission, etc.) 102 incorporating an over molded wire harness assembly 104 using the innovative overmold system in accordance with an aspect of the innovation. The wire harness assembly 104 includes a molded wire harness 106 and clips 108 that may or may not be molded into the molded wire harness 106 to attach the molded wire harness 106 to the vehicle component 102. As illustrated in FIG. 1A and described further below, another advantage to the innovation disclosed herein is that the over molded wire harness 106 can incorporate bend points 110. In other words, during assembly of the wire harness 106, the wire harness 106 can bend and be formed in a three dimensional manner (i.e., x-, y-, and z-directions) to conform to a shape of the vehicle component 102.

Figure 1B:
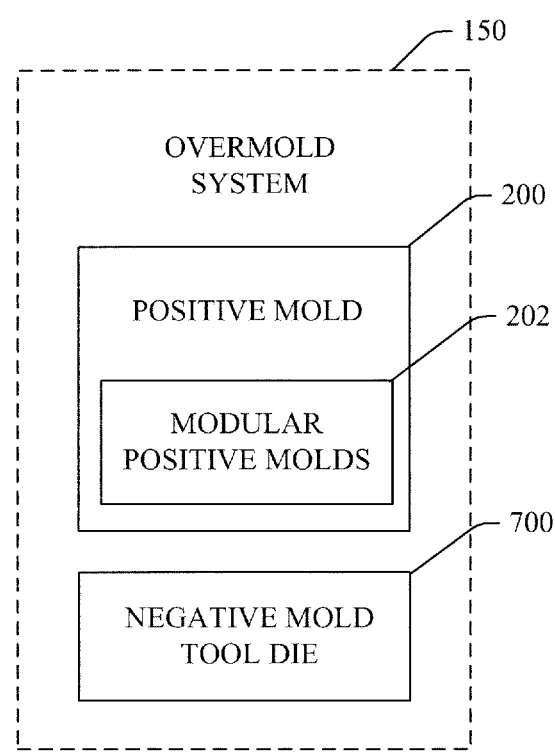
FIG. 1B is a block diagram illustration of an overmold system in accordance with an aspect of the innovation.

FIG. 1B is a block diagram illustration of an overmold system 150 to produce the over molded wire harness 106 shown in FIG. 1A in accordance with an aspect of the innovation. The overmold system 150 includes a positive mold 200 formed from modular positive molds (or blocks, units, etc.) 202 and a negative mold tool die 700, which is formed from the positive mold 200. Specifically, the positive mold 200 is created to create a negative pattern in the negative mold tool die 700. The negative mold tool die 700 is then utilized to hold a wire harness during the overmold process as will be described below.

Figure 2A:
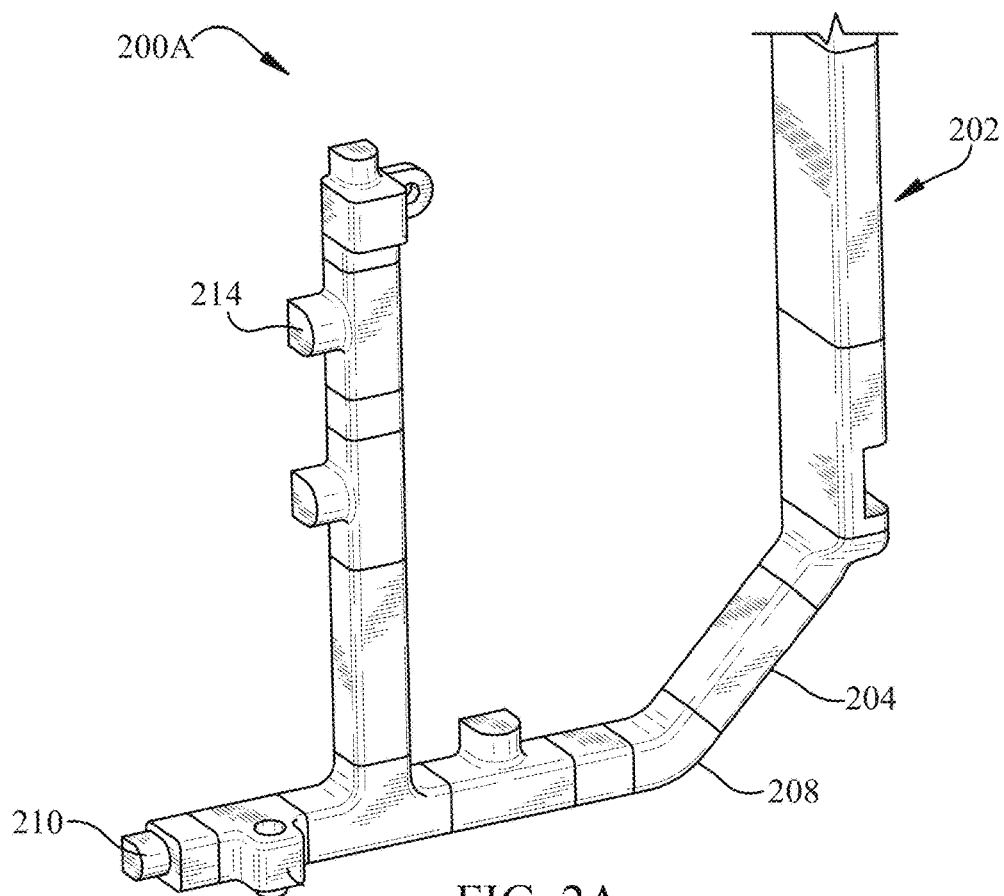
FIGS. 2A-2B illustrate perspective views of example embodiments of an innovative positive mold in accordance with an aspect of the innovation.
Figure 2B:
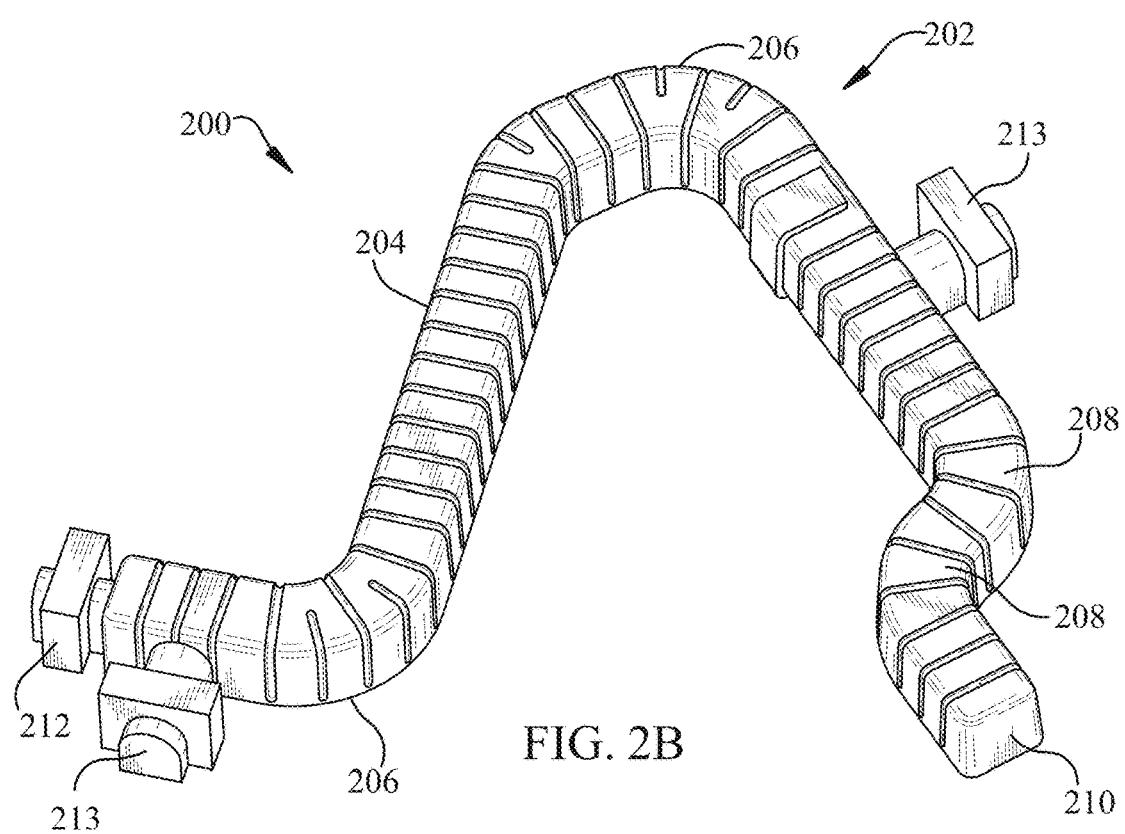
Figure 2C:
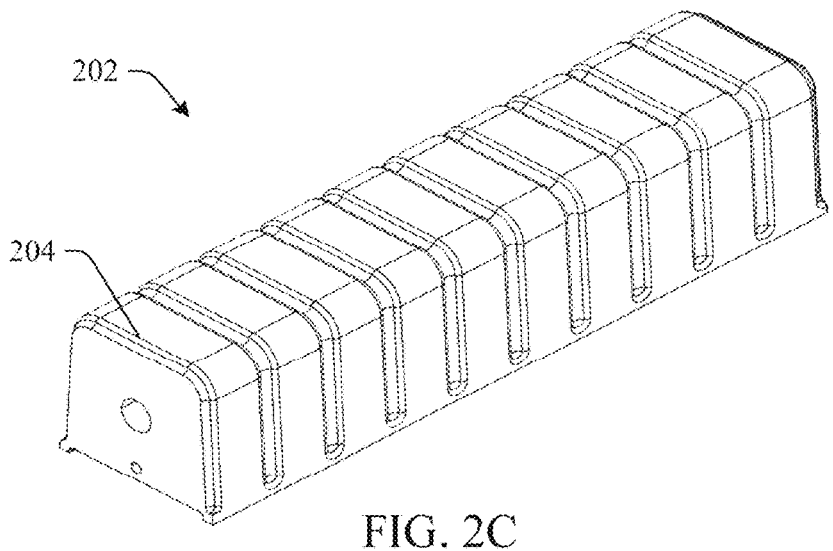
FIGS. 2C-2J illustrate perspective views of example modular blocks in accordance with an aspect of the innovation.
Figure 2D:
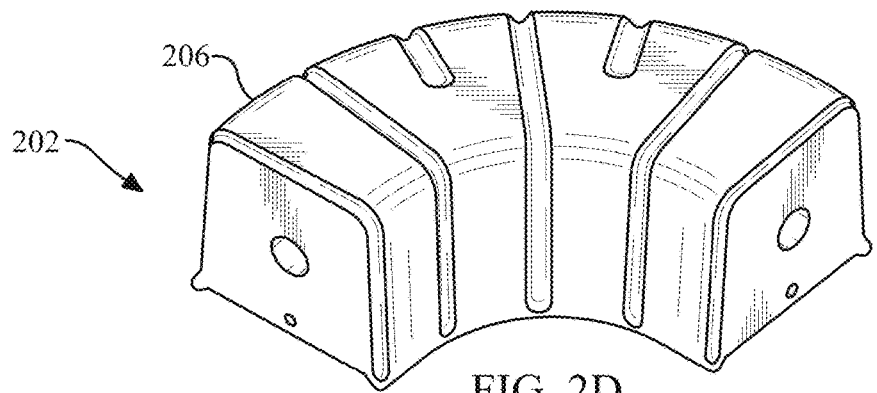
Figure 2E:
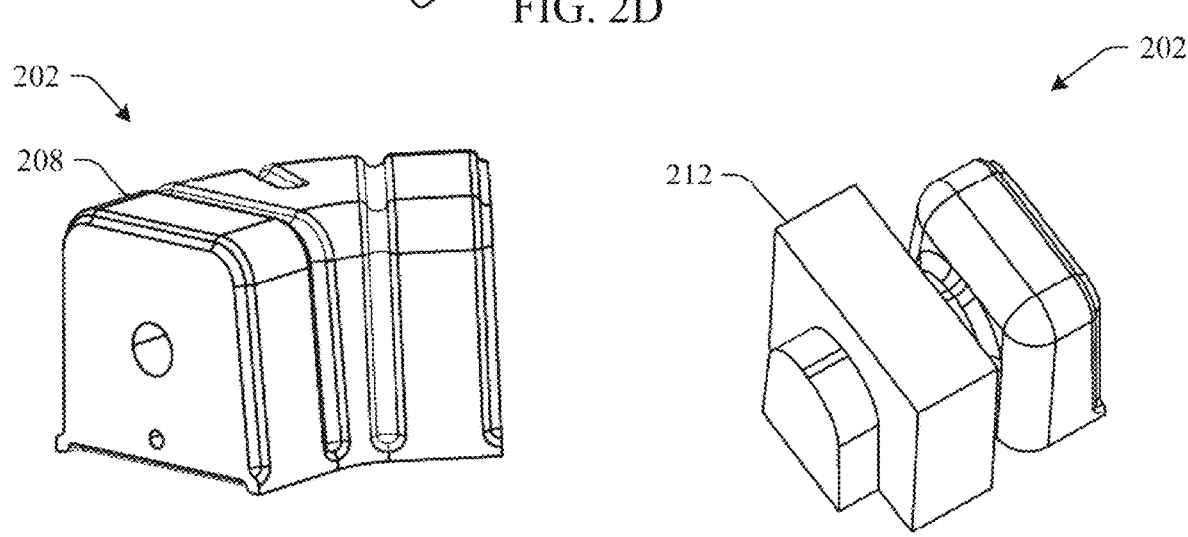
Figure 2F:
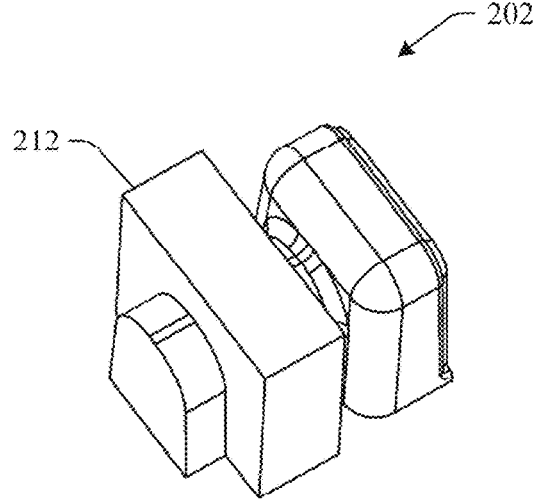
Figure 2G:
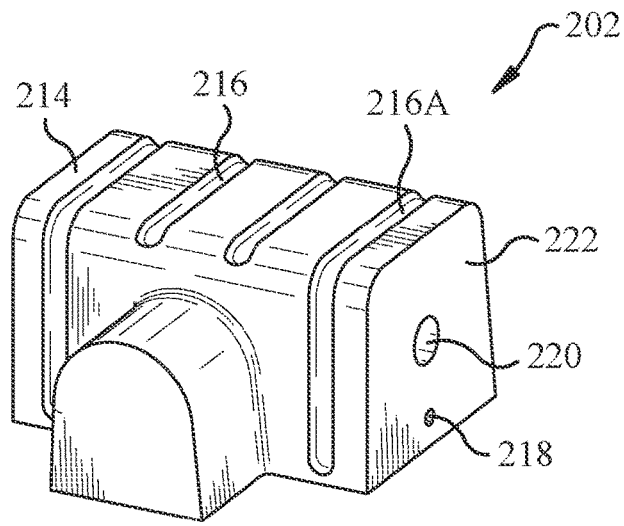
Figure 2H:
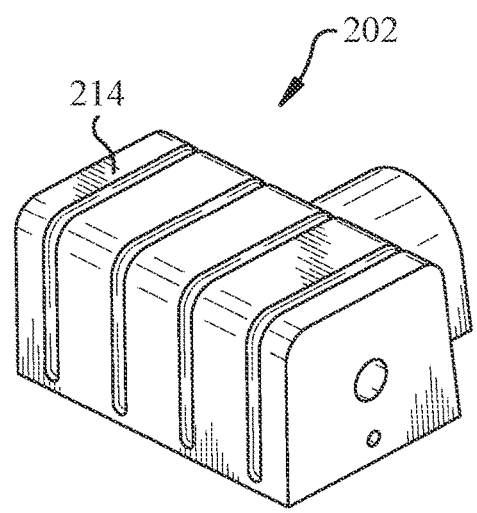
Figure 2I:
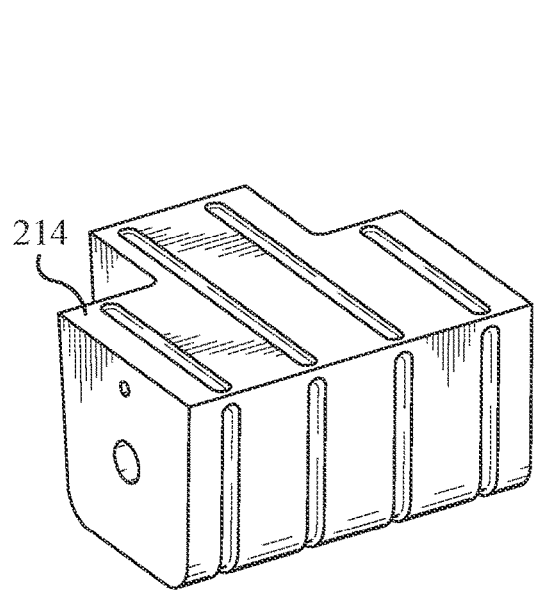
Figure 2J:
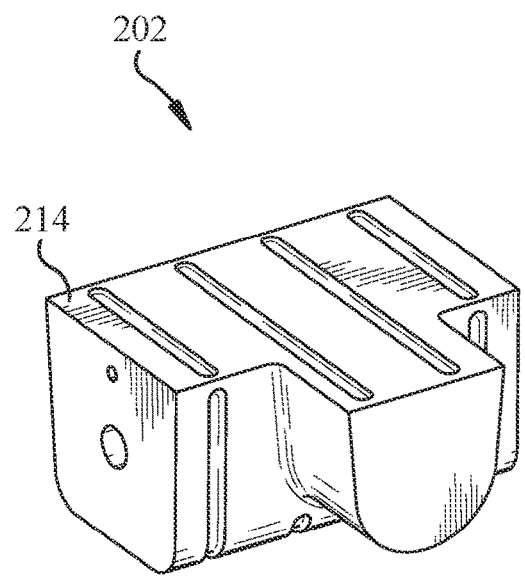

FIGS. 2A and 2B are example embodiments of positive molds 200A, 200B made from multiple modular positive molds 202 in accordance with an aspect of the innovation. More specifically, the positive molds 200A, 200B are modular-reusable positive molds made from different shapes of smaller positive molds or modular blocks 202 that are connected together to form the positive mold 200A, 200B based on the wire harness design requirements. The modular positive molds 202 can be arranged in any pattern to form different shaped positive molds as illustrated by the example positive mold configurations in FIGS. 2A and 2B. The modular positive molds 202 can be standardized and interchanged to create different positive molds specific to the application. In other words, the modular positive molds 202 can be disassembled, reused, and reconnected to create a different shaped positive mold based on a design of the wire harness.

Still referring to FIGS. 2A and 2B and also to FIGS. 2C-2G, the modular positive molds 202 may be made from any suitable material, such as but not limited aluminum, urethane, etc. Further, the modular positive molds 202 may come in many shapes, sizes, and lengths, such as but not limited to, straight sections 204, angled sections, such as but not limited to, a 90° angled section 206, a 45° angled section 208, etc., end sections 210, break-out sections 212, intermediate break-out sections 213, T-sections 214, etc. Break out sections 212 are configured to allow a portion of the wiring harness to extend out of the over molded wire harness 106 for connection with the vehicle component 102 or another part of the vehicle.

FIGS. 2G-2J are isometric views of the T-section to illustrate the features of the modular positive molds 202. The modular positive molds 202 have features similar to that of the T-section 214. Thus, the T-section 214 is simply used for illustration purposes only to demonstrate some features of the modular blocks 202 and is not intended to limit the scope of the innovation. The T-section 214 includes optional grooves 216, an alignment notch 218, and a connection notch 220. The alignment notch 218 and connection notch 220 will be described in more detail below with reference to FIGS. 5A-5C.

The spacing between adjacent grooves 216 and the spacing between an end groove 216A and an end 222 of the T-section 214 are predetermined prior to making the T-section 214. For example, the spacing may be approximately 20 mm between adjacent grooves 216 and approximately 10 mm between the end grove 216A and the end 222 of the T-section 214. Thus, when two T-sections 214 or modular positive molds 202 are connected together the spacing between adjacent end grooves 216A is approximately 20 mm. It is to be understood that the spacing between adjacent grooves 216 can be any distance and is not limited to the disclosure herein. Thus, the above description is for illustrative purposes only and is not intended to limit the scope of the innovation.

Figure 3A:
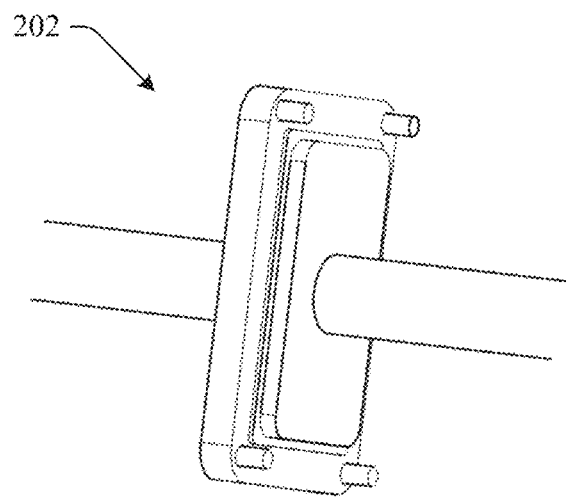
FIGS. 3A and 3B illustrate perspective views of example modular blocks in accordance with an aspect of the innovation.
Figure 3B:
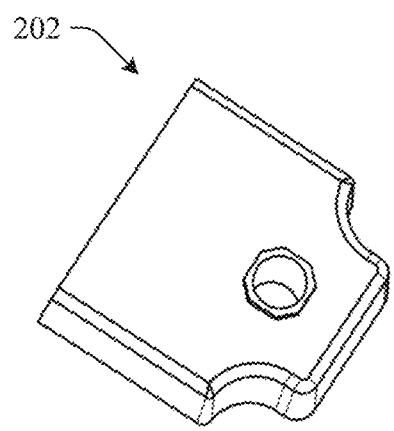

FIGS. 3A and 3B illustrate other example embodiments of modular positive molds 202 in accordance with an aspect of the innovation. Specifically, the modular positive molds can be any shape as desired based on the design of the wire harness. For example, FIG. 3A is an illustration of a device that can be utilized in lieu of bulkhead connectors.

Figure 4:
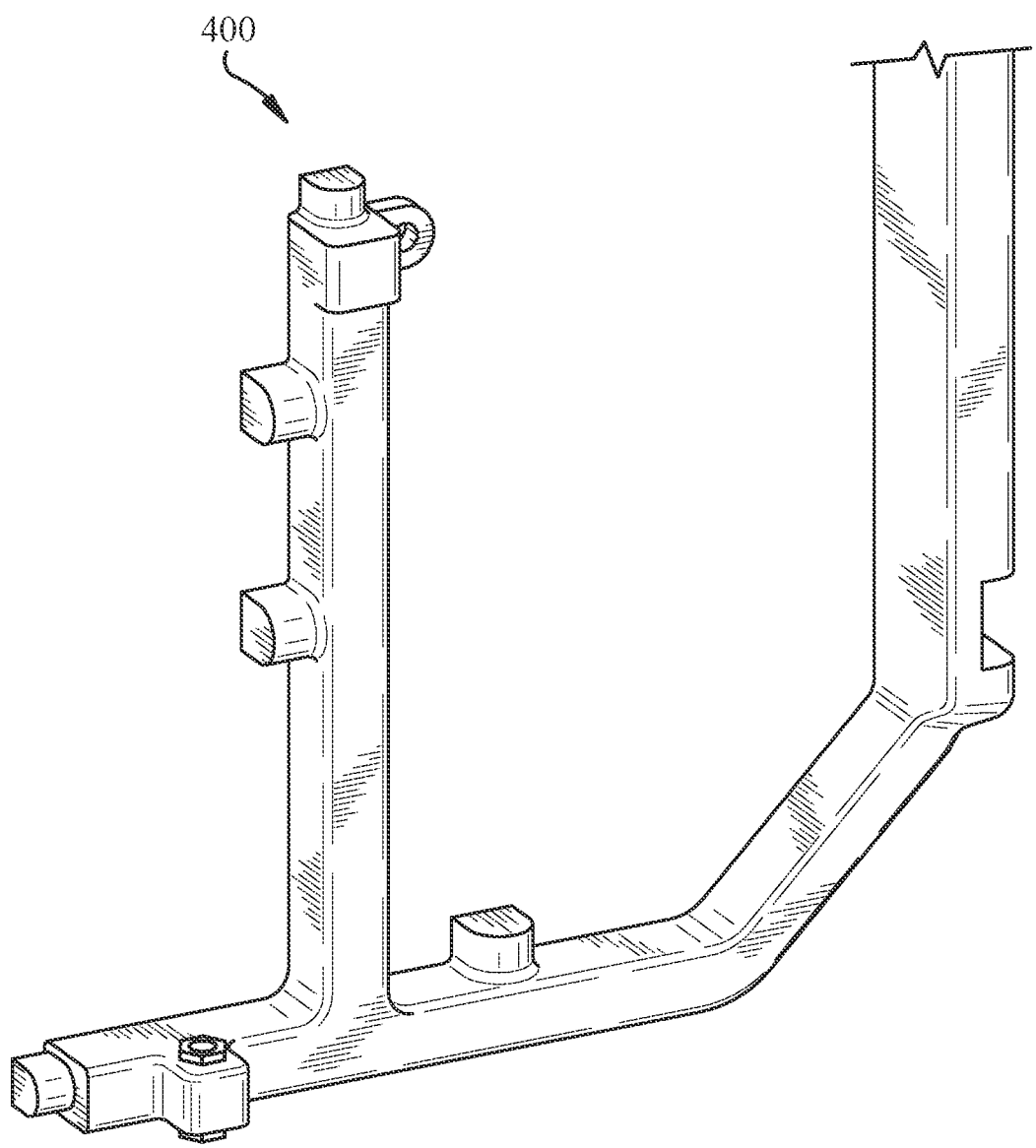
FIG. 4 illustrates an alternative embodiment of a positive mold in accordance with an aspect of the innovation.

FIG. 4 illustrates an alternative embodiment of a positive mold 400 in accordance with an aspect of the innovation. In this embodiment, the positive mold 400 may be comprised of a single integrated unit. The integrated positive mold 400 may be made from any suitable material, such as but not limited aluminum, urethane, etc.

Figure 5A:
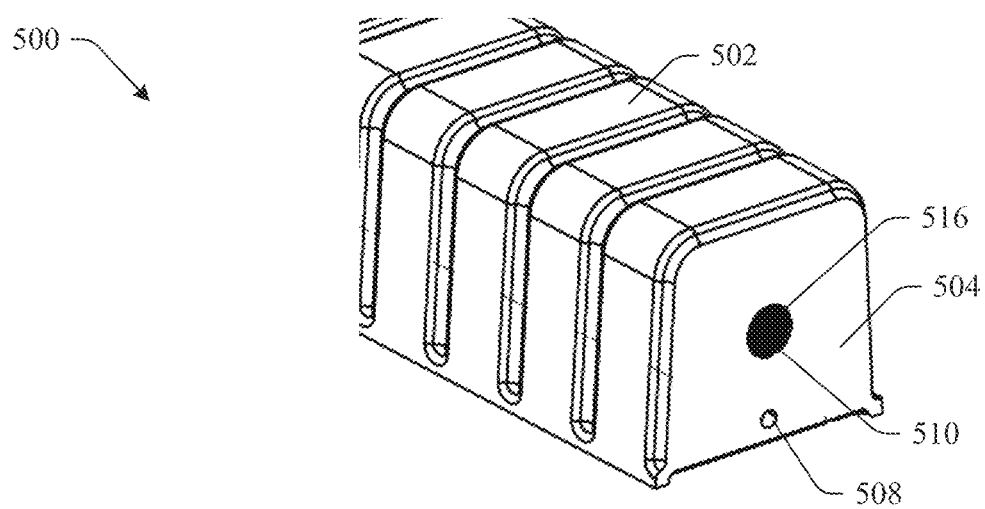
FIGS. 5A-5C illustrate an example connection device between adjacent modular blocks in accordance with aspects of the innovation.
Figure 5B:
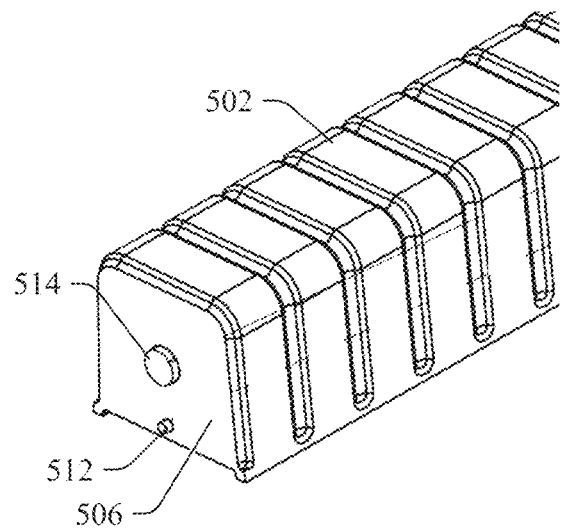
Figure 5C:
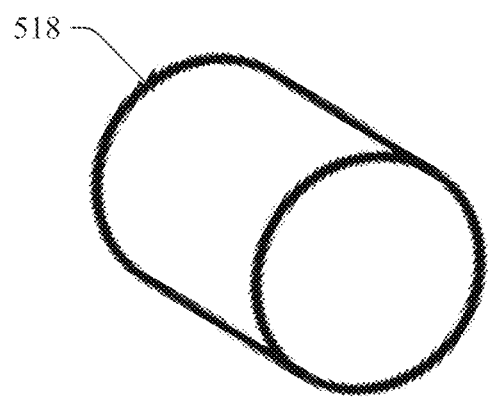

FIGS. 5A-5C illustrate one embodiment of an alignment/connection device 500 between adjacent modular positive molds 502 in accordance with an aspect of the innovation. The alignment/connection device 500 includes an alignment device and a connection device. FIGS. 5A and B are isometric views of an example modular positive mold 502 that is similar to the modular positive molds 202 described above. Each end face 504, 506 of the modular positive mold 502 includes an alignment notch 508 and a connection notch 510 defined therein. The alignment notch 508 is adapted to receive the alignment device, such as, an alignment pin 512, as shown in FIG. 5B. When two modular positive molds 502 are connected, the alignment pin 512 is received in adjacent alignment notches 508 thereby insuring that adjacent modular positive molds 502 are properly aligned.

Still referring to FIGS. 5A-5C, the connection device is comprised of a first part 514 inserted into the connection notch 510 of one modular positive mold 502 and a second part 516 inserted into the connection notch 506 of the adjacent modular positive mold 502. As shown in FIG. 5B, the first part 514 projects beyond the end face 506 of the modular positive mold 502, thus forming a male end. As shown in FIG. 5A, the second part 516 is indented into the end face 504 of the modular positive mold 502, thus forming a female end. In the embodiment illustrated in FIGS. 5A-5C, the first part 514 is comprised of a magnet 518, shown in a close-up view in FIG. 5C, and the second part 516 is comprised of a plug made from a material that attracts the magnet 518, such as but not limited to steel. It is to be understood that the first part 514 may be the plug made of a material that attracts the magnet 518 and the second part 516 may be the magnet 518. When connected, the first part 514 and the second part 516 secure adjacent modular positive mold 502 to each other. It is to be appreciated that any type of connection device may be used to connect adjacent modular positive mold 502, such as but not limited to, screws, clips, snaps, adhesive, etc.

Figure 6:
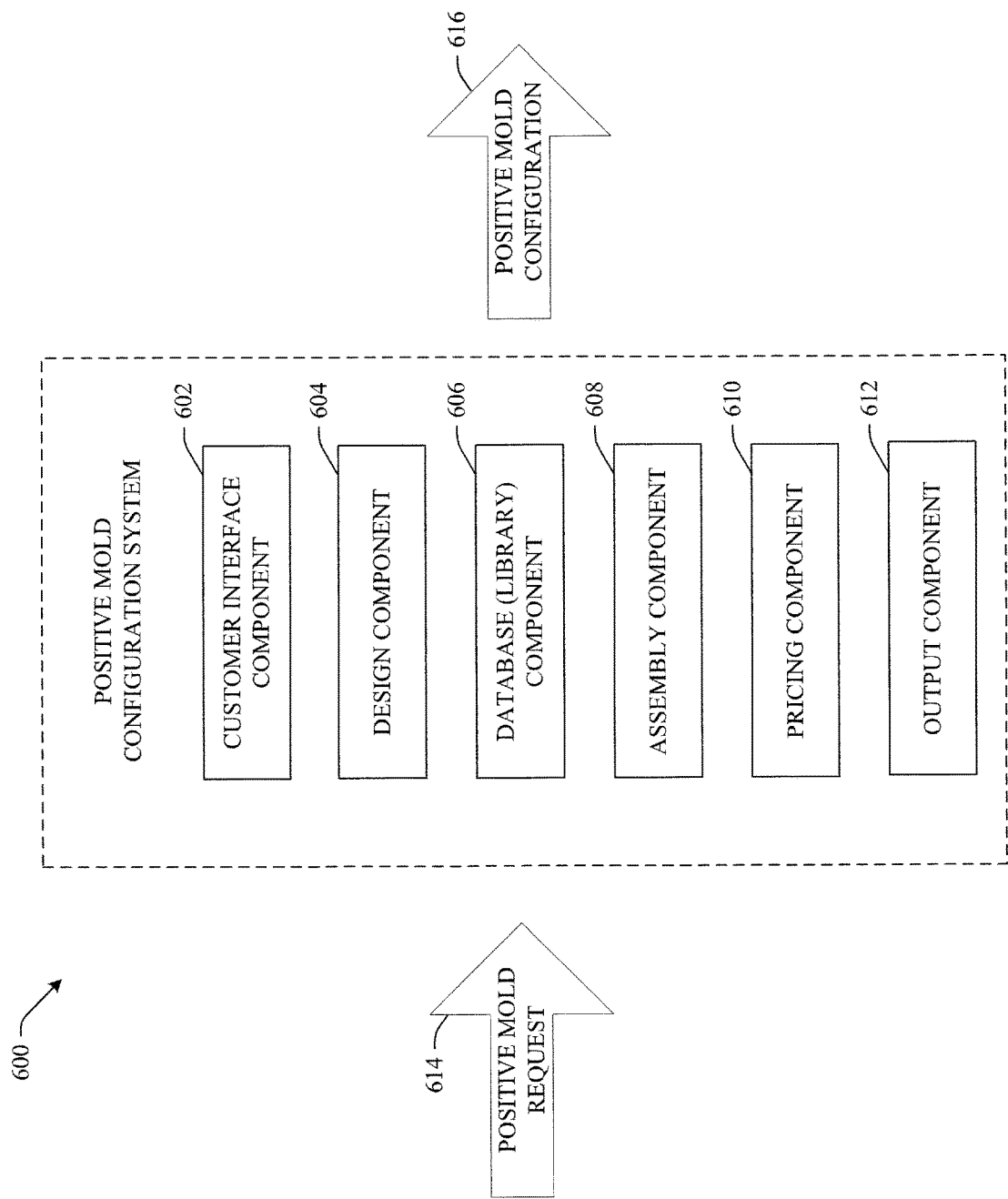
FIG. 6 illustrates an example positive mold design system in accordance with an aspect of the innovation.

FIG. 6 is an illustration of a positive mold configuration system 600 in accordance with an aspect of the innovation. The system 600 includes several components including a customer interface component 602 that allows the customer to access the system 600 and enter design requirements for the positive mold. For example, the interface component 602 may be a web-based interface accessible to customers via entry of a user identifier and a password.

A design component 604 is provided to allow the customer to design the positive mold based on the wire harness specification. The design component 604 may be a computer generated component to enable the customer to model (e.g., 3D modeling) the positive mold. Further, the design component 604 may include sub-components to assist the customer in designing the positive mold (e.g., number of bends, types of modular blocks, etc.). The design component 604 may also include a sub-component that provides recommendations to the customer based on a number of factors, such as but not limited to, pricing, ease of installation, etc.

A database component 606 is provided and includes a library of modular positive molds, as described above, for the customer to choose from. The customer utilizes the design component 604 to access the database component 606 while designing the positive mold. The library of modular positive molds can be created and may be accessible to the client to allow the client to create the positive mold described above for specific applications utilizing, for example, a 3D design tool. The library eliminates the need for a design engineer to have extensive knowledge in the area of mechanical engineering and overmold tool creation. The design engineer simply identifies the required shapes from the library and connects them together based on the wire harness design requirements. This process saves tremendous amount of time for the design engineer and suppliers, and standardizes the overmold harness design.

An assembly component 608 is provided that provides a computer generated assembly of the positive mold based on the results from the design component 604 and the chosen modular blocks from the database component 606. The computer generated assembly may be in any 2D or 3D form, such as but not limited to, a CAD drawing, a 3D model, etc.

A pricing component 610 is provided and can provide real time pricing as the customer designs and assembles the positive mold. The pricing component 610 can also provide comparisons of alternative designs that meet the customer requirements if the alternative designs are more cost effective than the original design.

An output component 612 provides either an electronic and/or a hardcopy output of the final design. The resulting design output may be in the form of a drawing and/or a specification such that the positive mold can be manufactured.

Figure 7:
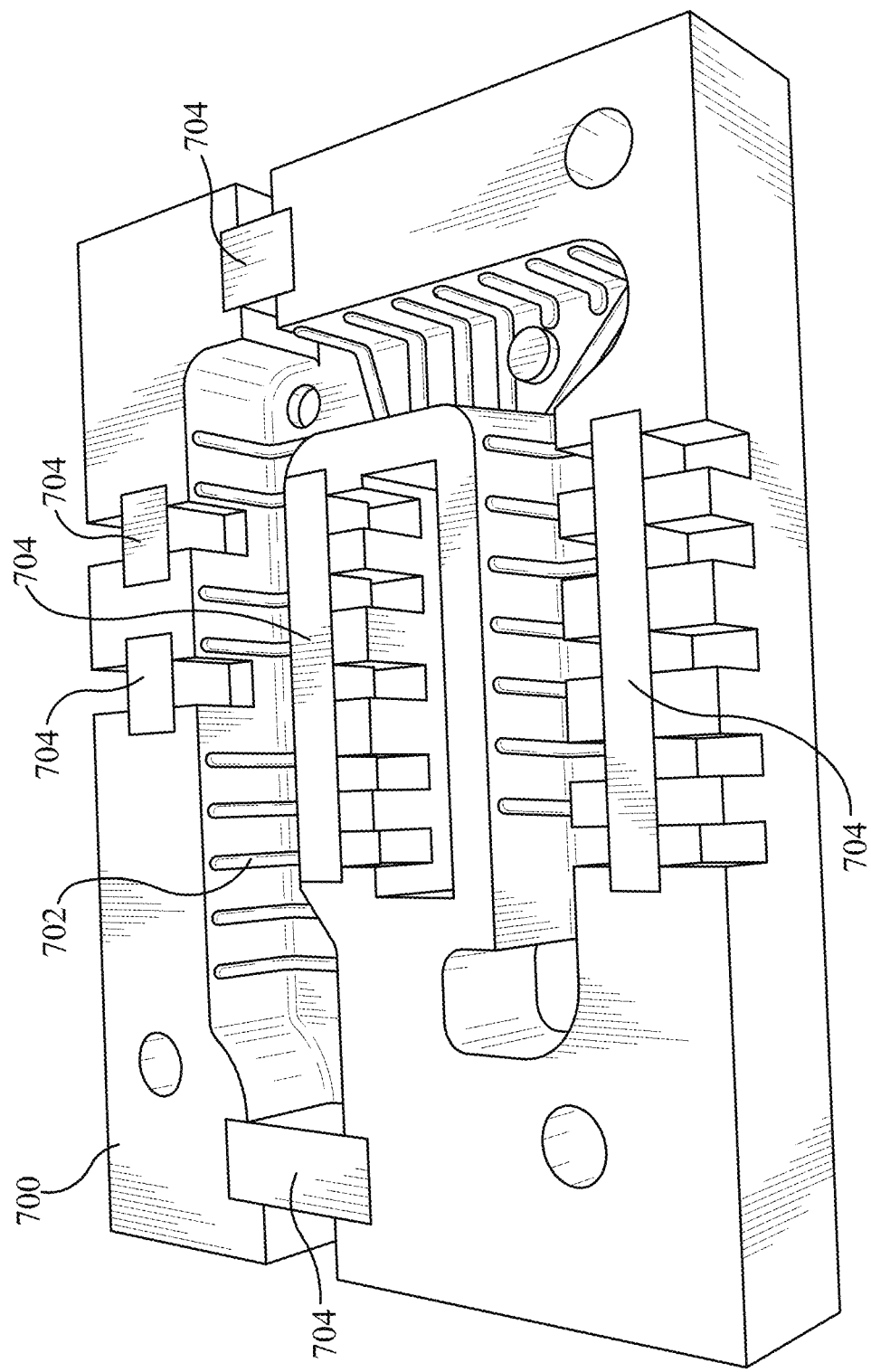
FIG. 7 illustrates an example embodiment of a negative mold in accordance with an aspect of the innovation.

Referring now to FIG. 7, FIG. 7 is an illustration of the negative mold tool die 700 (hereinafter "negative mold") mentioned above in accordance with an aspect of the innovation. As mentioned above, the positive mold is created to create a negative pattern or mold 702 in the negative mold tool die 700. To form the negative mold 700, the positive mold 200 is placed into a container and the material to which the negative mold 700 will be formed is poured into the container over the positive mold 200. Once the material cures, the positive mold 200 is removed thereby forming the negative mold 700.

An advantage to the innovative negative mold 700 is that the negative mold 700 can be made from a lightweight material, such as but not limited to, urethane. This allows the negative mold 700 to be portable and as such, the negative mold 700 can be attached directly to a wire harness assembly board. The wire harness can then be assembled directly into the negative mold 700 while attached to the wire harness assembly board. The overmold material mentioned above can then be injected into the negative mold 700 without the need to transfer the negative mold 700 including the wire harness to a separate molding station.

Still referring to FIG. 7, overflow stops or shut-off inserts 704 may be provided in accordance with an aspect of the innovation. The shut-off inserts 704 may be made of any suitable material to withstand the pressure of the overmold material, such as but not limited to, silicon and are used to control the overflow of material during the injection molding process. As mentioned above, in conventional over molding processes, when a pressured overmold material is injected in to the negative mold tool die, some of the material tends to overflow out of the negative mold tool die and on to the portion of the wire harness outside the negative mold tool die. The shut-off inserts 704 prevent the overmold material from flowing onto branches of the wire harness that does not require over molding.

Figure 8A:
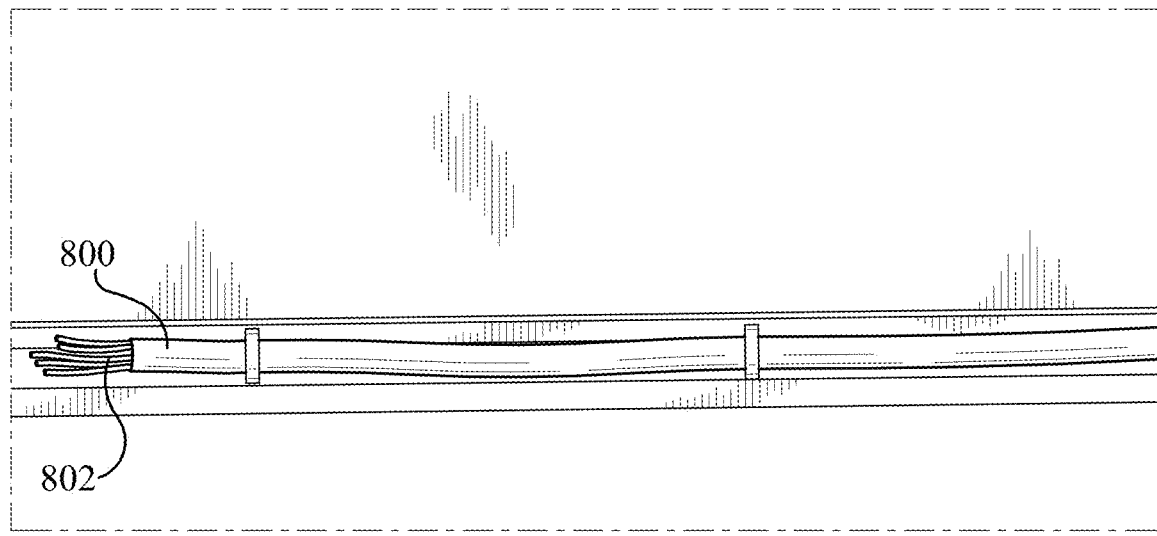
FIGS. 8A and 8B illustrate an example embodiment of a pliable insert in accordance with an aspect of the innovation.
Figure 8B:
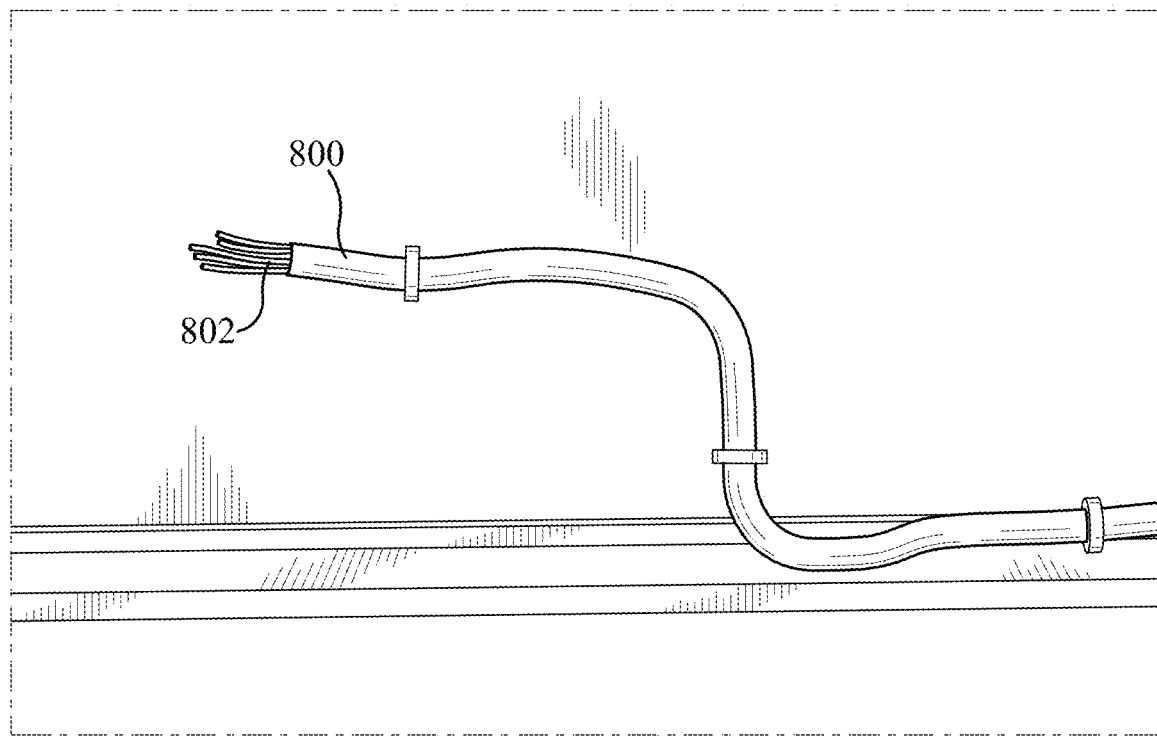

Referring to FIGS. 8A and 8B, a formable insert 800 may be provided as part of the overmold system 150 in accordance with an aspect of the innovation. The formable insert 800 wraps around a portion or portions of wire bundles 802 of the wire harness. The formable insert 800 may be assembled as part of the wire harness assembly and is pliable and, thus, able to hold the shape once formed. The formable insert 800 allows the wire harness to be routed in the tight spaces and areas with various forms, and allows the wire harness to be routed and held in the 'z' direction. Thus, it is possible to form three dimensional (e.g., x, y, and z-directions) wire harness routing from simple two dimensional patterns (e.g., x and y-directions). The formable insert 800 may be made of any suitable material that is pliable and able to hold a shape once formed, such as but not limited to aluminum sheathing, copper wire, etc. Notches or any other type of marking can be included on the formable insert 800 to identify bending points in wire harness. Once the formable insert 800 is formed around the wire harness and the wire harness is placed in the negative mold 700, the overmold material can be applied to form the overmold wire harness.

Figure 9:
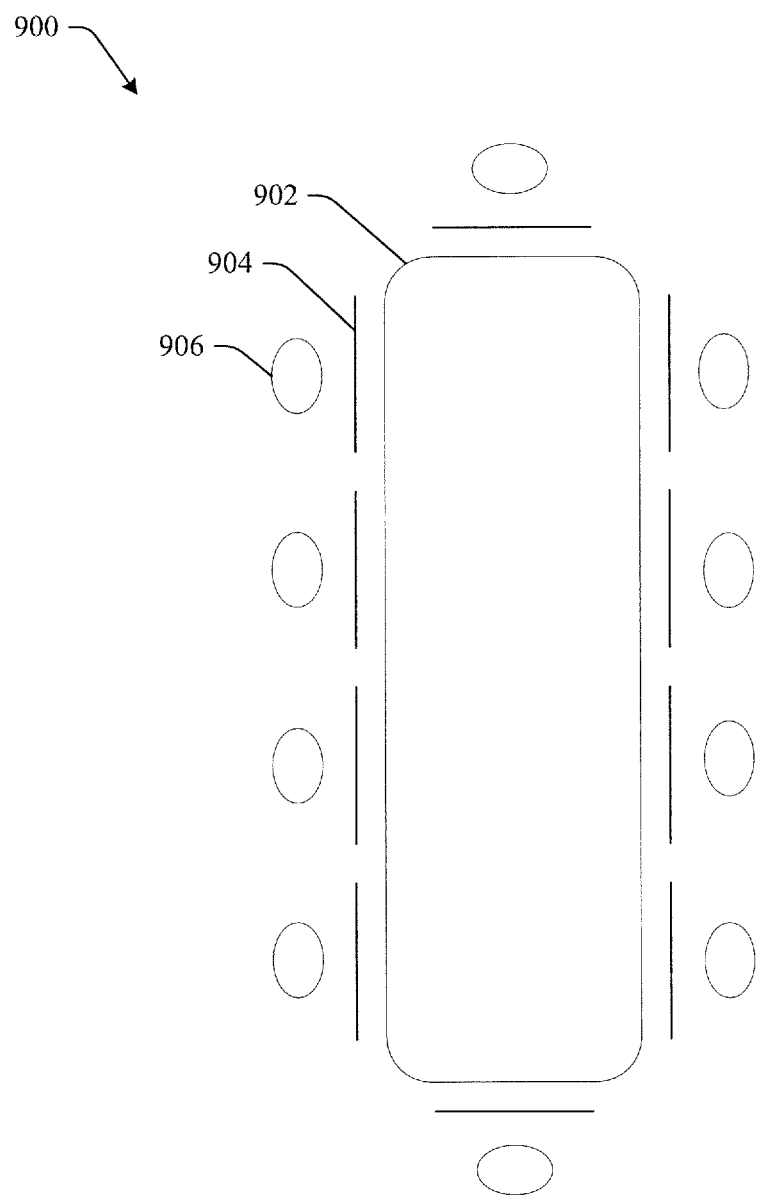
FIG. 9 illustrates an example wire harness assembly line in accordance with an aspect of the innovation.

Referring to FIG. 9, the overmold system 150 may include an assembly line system 900 in accordance with an aspect of the innovation. The assembly line system 900 may include a carousel 902 that transports multiple wire harness assembly boards 904 between multiple work stations 906. In this arrangement, the negative mold 700 can be attached to each wire harness assembly board 904. The carousel 902 is then rotated between the multiple work stations 906, whereby a specific task for assembling the wire harness in each negative mold 700 is carried out at each work station 906. For example, certain wires can be placed in the negative mold 700 at several work stations, a connector can be attached at another work station 906, etc. In addition, one work station 906 can be an injection mold station where, the overmold material can be injected into the negative mold 700. This process including the ability to mount the negative mold 700 directly to the wire harness assembly board 904 facilitates high volume production and eliminates the need for a separate injection mold station.

Figure 10A:
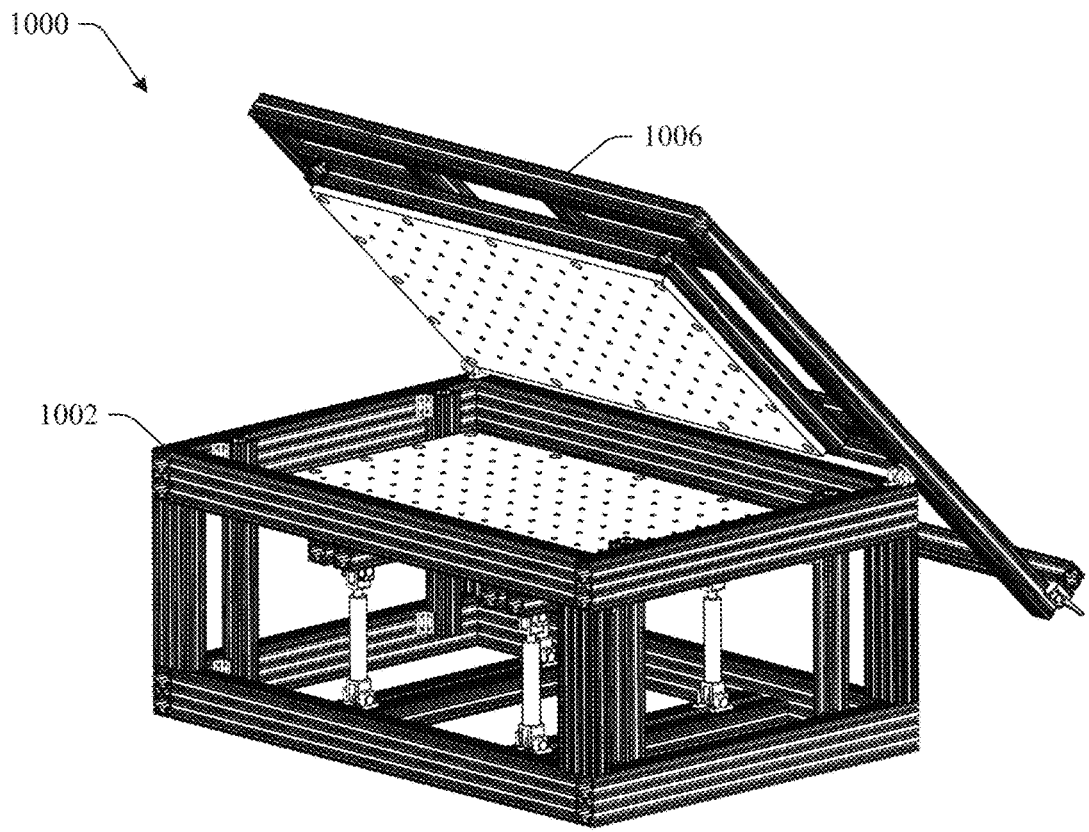
FIGS. 10A and 10B illustrate an example embodiment of an overmold injection work frame in accordance with an aspect of the innovation.
Figure 10B:
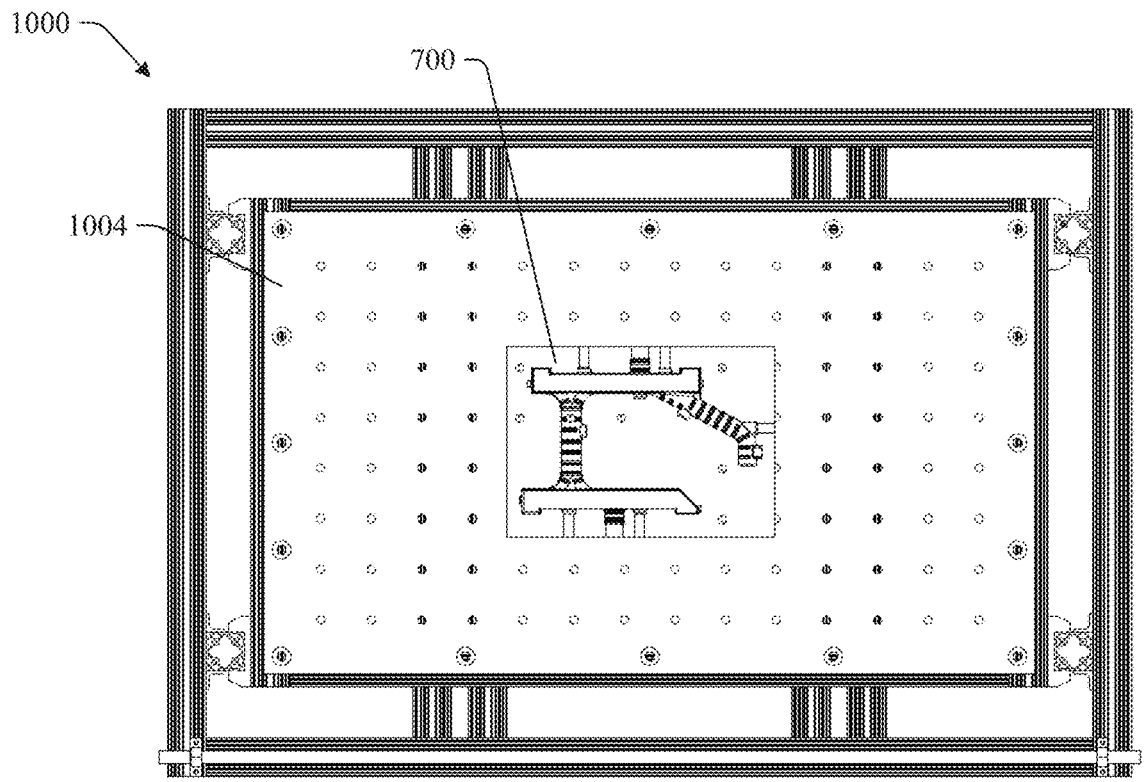

In an alternative embodiment illustrated in FIGS. 10A and 10B, the injection mold station for injecting the overmold can be separate from the carousel 902 and be comprised of a clam-shell mold station 1000 that accepts all negative molds 700. The clam-shell station 1000 includes a frame portion 1002 that includes a mounting platform 1004 and a pivotal cover 1006. To inject the overmold, the negative mold 700, which includes the wire harness is mounted to the mounting platform 1004, as shown in FIG. 10B, and the pivotal cover 1006 is closed. The overmold is injected into the clam-shell frame 1000 thereby applying the overmold to the wire harness. The advantage to this method is that the frame 1000 is common to each and every negative mold and, thus, can accept all the negative mold designs.

Figure 11:
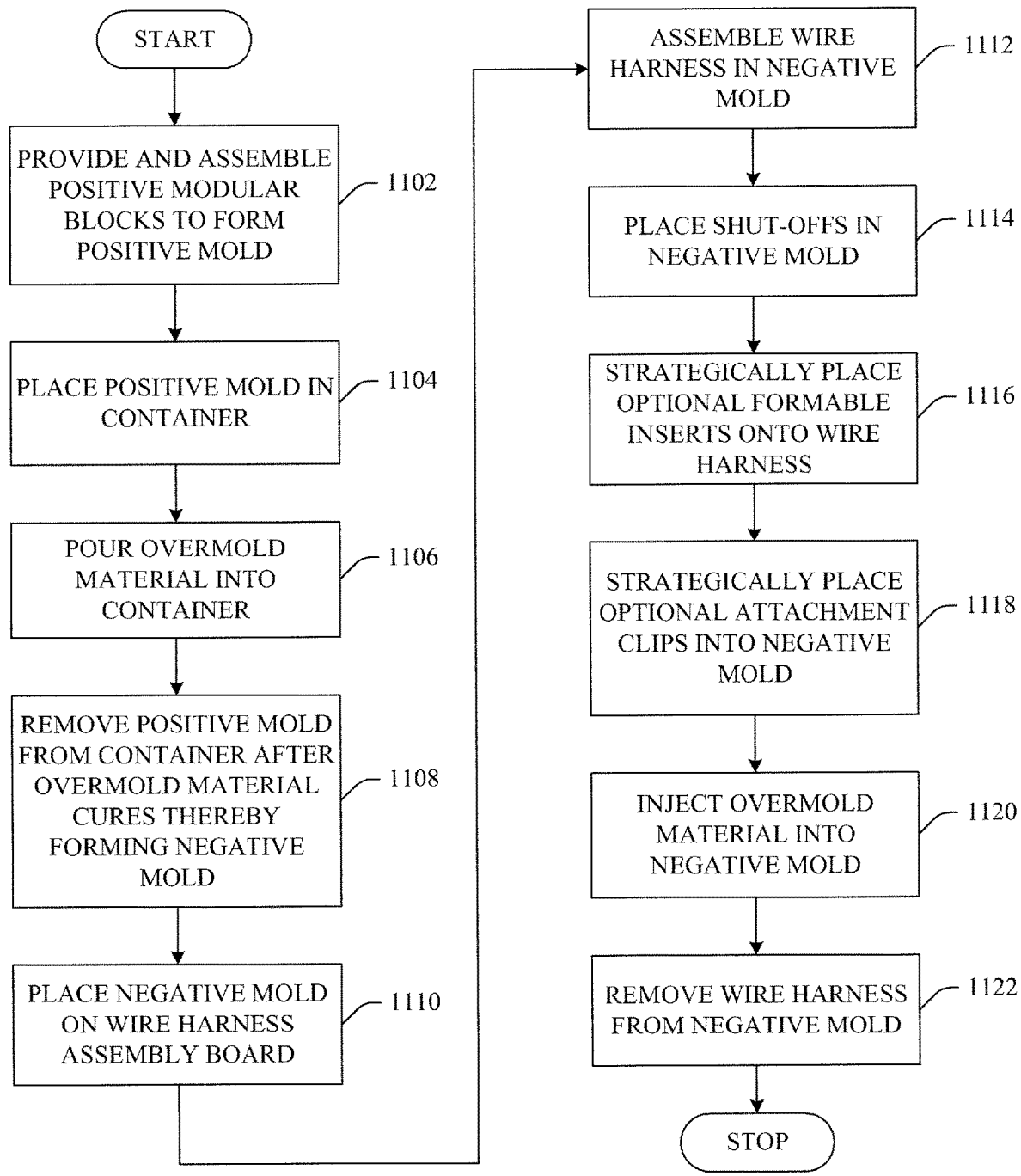
FIG. 11 is a flow chart illustrating an example method of manufacture an over molded wire harness in accordance with an aspect of the innovation.

With reference to FIG. 11, a process of producing an over molded wire harness incorporating the innovative system and method of producing a positive mold and, hence, a negative mold will be described in accordance with an aspect of the innovation. At 1102 modular blocks 202 are provided and assembled to form a positive mold 200 in accordance with design output described above. At 1104, the positive mold 200 is placed in a container that is suitable to contain the overmold material. At 1106, the overmold material, such as but not limited to, foam is poured into the container over the positive mold 200. At 1108, once the material cures, the positive mold 200 is removed from the container thereby forming the negative mold 700. At 1110, the negative mold 700 is placed on a wire harness assembly board 904, as described above. At 1112, the wire harness is assembled in the negative mold 700 as the wire harness assembly board 904 rotates around the assembly line or carousel 902 to each work station 906, as described above. At 1114, shut-off inserts 704 are placed at locations in the negative mold 700 to prevent the overflow material from flowing outside the negative mold 700. At 1116, as an option, formable inserts 800 may be wrapped around portions of the wire harness and the wire harness may be shaped in any direction to conform to the shape of the vehicle component, as described above. At 1118, as another option, the attachment clips 108 described above may be placed in certain locations of the negative mold 700. At 1120, the overmold material is injected into the negative mold 700. At 1122, the wire harness is removed from the negative mold 700.

What has been described above includes examples of the innovation. It is, of course, not possible to describe every conceivable combination of components or methodologies for purposes of describing the subject innovation, but one of ordinary skill in the art may recognize that many further combinations and permutations of the innovation are possible. Accordingly, the innovation is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. An overmold system for producing an over molded wire harness comprising:
   a positive mold including a plurality of interchangeable modular positive molds;
   a negative mold tool die produced from the positive mold and adapted to receive a wire harness and an overmold material that forms the overmold for the wire harness;
   at least one shut-off insert placed in the negative mold tool die to prevent the overmold material from overflowing from the negative mold tool die;
   an assembly board that receives the negative mold tool die; and
   at least one formable insert comprising:
      a pliable material that holds a shape once formed and substantially maintains that shape during application of the overmold material, disposed around at least a portion of a wire bundle of the wire harness to form a three dimensional shape for the wire harness that conforms to a shape of a vehicle component prior to application of the overmold material, and
      at least one notch to identify a bending point of the wire bundle,
   wherein the plurality of interchangeable modular positive molds includes at least one section that allows a portion of the wire harness to extend out over the overmold facilitating a connection to a component.

2. The overmold system of claim 1, wherein the formable insert comprises copper.

3. The overmold system of claim 1, wherein the plurality of interchangeable modular positive molds include an alignment notch and a connection notch defined in each end face.

4. The overmold system of claim 3 further comprising an alignment device that aligns adjacent modular positive molds when connected and a connection device providing a connection between adjacent modular positive molds, wherein the alignment notch is adapted to receive the alignment device and the connection notch is adapted to receive the connection device.

5. The overmold system of claim 4, wherein the connection device includes a first part inserted into the connection notch such that the first part extends beyond the end face of the modular positive mold and a second part inserted into the connection notch of an end face of an adjacent modular positive mold such that the second part is indented into the end face.

6. The overmold system of claim 5, wherein the alignment device is an alignment pin and the first part of the connection device is a magnet and the second part of the connection device is a plug made from a material that attracts the magnet.

7. The overmold system of claim 1 further comprising an assembly line system including:
   a plurality of assembly boards adapted to receive the negative mold tool die;
   a plurality of workstations for performing different functions; and
   a carousel that transports the plurality of assembly boards between workstations.

8. The overmold system of claim 7, wherein at least one of the plurality of workstations is an injection mold workstation that injects the overmold material into the negative mold tool die.

* * * * *